United States Patent Office 3,255,143
Patented June 7, 1966

3,255,143
COATING COMPOSITION AND METHOD OF PREPARATION
Clarence Henry Helbing, Shelbyville, Ind., assignor to Pittsburgh Plate Glass Company, Pittsburgh, Pa., a corporation of Pennsylvania
No Drawing. Filed Dec. 29, 1960, Ser. No. 79,137
2 Claims. (Cl. 260—29.7)

The present invention relates to a coating composition and a method of preparing the composition, and it has particular relation to a relatively viscous coating composition which is suitable for application to porous, fibrous blankets or boards without substantial impregnation of the blankets or boards.

Glass fiber blankets such as produced by the process shown in U.S. Patent No. 2,489,243 are useful as insulating linings for air conditioning ducts. They serve as both thermal and acoustical insulation when positioned along the inside walls of sheet metal ducts. The surface of the blankets which is exposed to the air carried in the ducts should be relatively smooth so as to not interfere with the flow of air or gas through the duct. For this purpose, it has been the practice to apply a coating to the fibrous blanket so that it presents the desired smooth surface.

The duct liner coating must be inexpensive to make and apply to the fibrous blanket. In use it must have a high resistance to fire in order to pass rigid flammability specifications. When applied to the fibrous blanket the material must be viscous enough so as to tend to form a film without substantial impregnation of the blanket. If there is too much impregnation of the blanket by the coating, an excessive amount of coating is necessary to achieve the smooth surface and the impregnation of the blanket reduces its efficiency in performing its desired functions.

It is therefore an object of the present invention to provide a viscous, fire resistant coating which can be applied to one surface of a porous, fibrous blanket by means of a doctor blade or similar spreading means to form a smooth film on the surface of the blanket without appreciable impregnation of the blanket.

In accordance with the present invention, a suitable coating composition is formed by combining a polychloroprene latex, a cross-linked, maleic anhydride-ethylene copolymer and an alkali metal hydroxide or other alkaline material to provide the proper pH to an aqueous dispersion of the coating. The coating composition is prepared by blending the maleic anhydride-ethylene cross-linked copolymer in water at an elevated temperature, cooling the blend, reacting the blend with potassium hydroxide solution to raise the pH of the blend to 11 to 12 and adding the polychloroprene latex to the blend. This coating material should have a pH of about 11 to 12, a viscosity of about 20,000 to 30,000 centipoises and should be at a temperature of about 80° to 90° F. when applied to a fibrous blanket such as a glass fiber blanket. The coating composition can be applied to the blanket by means of suitable apparatus employing a doctor blade such as the apparatus shown and described in my copending application, Serial No. 681,362 filed August 30, 1957. After the coating is applied to the surface of the blanket, the coated blanket is passed through an oven to dry it and adhere the coating to the surface of the blanket.

The following example illustrates a preferred embodiment of the coating composition and method of making and using it.

| Coating component: | Pounds |
|---|---|
| Water (tap water—cold) (68.7 gals.) | 573 |
| Maleic anhydride-ethylene-divinyl benzene copolymer | 13 |
| Potassium hydroxide | 32 |
| Polychloroprene latex (aqueous dispersion containing about 48 percent by weight solids) | 1000 |

In the preparation of the coating composition, the water is first poured into a mixing tank. The copolymer is next added to the water and blended in thoroughly. The aqueous blend of the copolymer is then heated to 180° to 200° F. for 20 to 30 minutes with constant agitation during the heating. The dispersion then gels and has a pH of about 2.4. The gelled dispersion is allowed to cool in the mixing tank to about room temperature. Potassium hydroxide is next added to raise the pH to about 11 to 12. Thereafter, the polychloroprene latex is blended into the coating composition as thus far prepared to form the final coating composition. The coating composition has a viscosity of 20,000 to 30,000 centipoises as tested by an RFV Model Brookfield viscosimeter using spindle No. 6 rotating at 20 revolutions per minute.

The coating composition as thus prepared is maintained at a temperature of about 80° to 90° F. for use. It is applied to the top surface of a blanket of glass fibers made up of short, discontinuous staple fibers as produced by the process described in the patent mentioned above and having a density of 1½ pounds per cubic foot and a thickness of ½ to 2 inches. The coated blanket passes under a doctor blade to distribute a thin film of the coating composition over the fibrous blanket. A film of approximately 10 to 20 grams per square foot is applied. This film is adhered to the surface of the blanket by passing the coated blanket through an oven to dry it. This drying may be carried at a temperature of about 325° to 450° F. for 3 to 6 minutes.

A material as thus produced was tested according to Underwriters' Laboratory Test No. UL 723 and gave a flame spread rating of 25.

The polychloroprene latex is a commercially available synthetic rubber product (neoprene) which is employed as an aqueous, alkaline dispersion containing about 55 percent by weight of polychloroprene particles. The particles are negatively charged and have an average particle size of about 0.15 micron in diameter. The polychloroprene latex solids may be present in the coating composition in an amount of about 25 to 35 percent by weight. Greater or lesser amounts of latex can be present providing the proper viscosity of the coating composition can be attained. They are present in the dried coating compositions in amounts in excess of 90 percent, for example 94 to 97 percent by weight of the dried composition.

The cross-linked copolymer of ethylene and maleic anhydride is present in the aqueous coating composition in an amount of 0.5 to 3 percent by weight. Only a relatively small amount of the cross-linked copolymer is required to provide the coating composition with the proper viscosity for application to the blanket. The cross-linked copolymer does not adversely affect the resistance of the polymer to fire. The ethylene is present in the copolymer in about one mole to one mole of the maleic anhydride. Maleic acid or an amide-ammonium salt of the acid can also be employed in place of the anhydride in making the copolymer according to the method set forth in U.S. Patent No. 2,378,629.

The copolymer is cross-linked with a suitable monomer containing at least two alpha, beta ethylenically unsaturated radicals, such as for example divinyl benzene, divinyl sulfone or divinyl spirobi-bis-m-dioxane. The amount of monomer employed is that amount which is sufficient to give the desired viscosity to the cross-linked copolymer. For example, sufficient cross-linking monomer can be used to give an aqueous dispersion having a pH of 9 and containing one percent by weight of the cross-linked copolymer having a viscosity of 145,000 to 175,000 centipoises, preferably about 160,000 centipoises, as measured by a Brookfield viscometer utilizing No. 6 spindle rotating at 5 revolutions per minute.

The cross-linking reaction is accomplished by hydrolyzing the anhydride or salt of the copolymer to the acid and reacting the cross-linking monomer to merely add the acid group to the unsaturated group in the monomer. This type of reaction is further described in British Patent No. 757,573. The cross-linked copolymer is a white powder which is readily dispersible in water. It forms a gel when mixed with water at a concentration of about 1 to 3 percent by weight.

The gelled dispersion of the cross-linked copolymer in water has a pH on the acid side, i.e., 2 to 4. A suitable amount of an alkaline material such as an alkali metal hydroxide is added to the gelled dispersion composition to provide it with a pH of about 11 to 12. This pH is desired because polychloroprene latex as commercially used is stable at this pH and the high viscosity mixture can be pumped and processed without having the latex go out of suspension. The amount of alkaline material used will vary depending upon the strength of the material and a sufficient amount is used to bring the pH to the desired figure.

Although the invention has been described with respect to specific details of certain embodiments thereof, it is not intended that such details serve as limitations on the scope of the invention except insofar as set forth in the accompanying claims.

I claim:
1. The method of forming a coated fiber glass blanket which is useful as an insulating lining for ducts, which method comprises
    associating short, discontinuous glass fibers having a density of about 1.5 pounds per cubic foot into a blanket;
    applying to the blanket, to impart a fire-retardant characteristic to the surface thereof, a thin film of an aqueous coating composition consisting essentially of water, polychloroprene latex, 0.5 to 3.0 percent by weight of a hydrolyzed copolymer of ethylene and maleic anhydride cross-linked with a difunctional monomer containing two alpha, beta ethylenically unsaturated radicals, and a sufficient amount of alkaline material to provide the aqueous coating composition with a pH of about 11 to 12, said coating having a viscosity of about 20,000 to 30,000 centipoises at the time of application to the glass fibers, and
    drying the film.
2. The coated glass fiber blanket formed according to the method of claim 1.

References Cited by the Examiner
UNITED STATES PATENTS

| | | | |
|---|---|---|---|
| 1,967,863 | 7/1934 | Collins et al. | 260—29.7 |
| 2,209,928 | 7/1940 | Nowak et al. | 260—92.3 |
| 2,880,182 | 3/1959 | Weissert | 260—29.7 |
| 2,893,892 | 7/1959 | Pinte et al. | 117—126 |
| 2,923,692 | 2/1960 | Ackerman et al. | 260—78.5 |
| 2,977,334 | 3/1961 | Zopf et al. | 260—28.5 |
| 2,988,539 | 6/1961 | Cohen et al. | 260—78.5 |

MURRAY TILLMAN, *Primary Examiner.*

DANIEL ARNOLD, LEON J. BERCOVITZ, WILLIAM H. SHORT, *Examiners.*

E. B. WOODRUFF, J. ZIEGLER, *Assistant Examiners.*